3,291,595
HIGH-NITROGEN PARTICULATE FERTILIZER COATED WITH NEUTRALIZED SUPERPHOSPHORIC ACID

Tommy C. Kearns, Park Forest, Ill., assignor to Swift & Company, Chicago, Ill., a corporation of Illinois
No Drawing. Filed Oct. 22, 1962, Ser. No. 232,263
2 Claims. (Cl. 71—49)

This invention relates to water soluble plant food and more particularly to improvements in the manufacture of noncaking substantially completely water soluble high grade granular fertilizers.

Plant food materials currently marketed as water soluble grades are primarily dry mixes consisting of a mechanical mixture of ammonium nitrate or urea, sulfate of potash, muriate of potash, monopotassium phosphate, potassium nitrate, and mono- or diammonium phosphate along with chelating agents and other minor elements. Because these mixes contain salts which are fine or crystalline and readily absorb water or contain some water, the mixture tends to cake on standing, becoming hard, and in some cases being converted into a single rocklike mass. In addition, these crystalline plant food mixes previously known to the art because they are prepared from solid raw materials which are not completely water soluble often leave a residue when they are dissolved in water, resulting in an imbalance in the liquid portion which is applied as a fertilizer and also clogging spray nozzles used in spraying equipment.

It is accordingly an object of this invention to provide free flowing water soluble plant food products which are granular and completely water soluble.

Another object of the invention is to provide essentially dry granular plant food which is water soluble and noncaking.

Additional unique features of the invention reside in the method for manufacturing the free flowing complete plant food. It has been the practice in the past in the production of plant food to combine phosphoric acid with a free ammonia source such as anhydrous ammonia to form mono- or diammonium phosphate. Since the phosphoric acid used in these processes is regular phosphoric acid containing 54% available phosphoric acid and 20-25% chemically free water, it has been difficult to add substantial amounts of phosphoric acid and obtain a mixture suitable for granulation without recycling the product through the granulator many times and finally drying the product. In those plant foods containing urea and/or ammonium nitrate, it is extremely difficult to remove sufficient water to ensure that the product will not cake. Furthermore, highly soluble ammonium salts and urea dissolve in the water, introduced into the granulator by way of the regular phosphoric acid, and a slurry or mud forms which is difficult to handle.

It is therefore an additional object of this invention to provide an improved method for producing high grade granular mixed fertilizers under essentially anhydrous conditions.

Still another object of the invention is the provision of a method for producing free flowing high grade mixed fertilizers in a form requiring no drying.

Additional objects, if not specifically set forth herein, will be readily apparent to those skilled in the art from the detailed description of the invention which follows.

Generally, the invention comprises the manufacture of mixed plant foods by combining a free ammonia supplying source with superphosphoric acid in a flow fusion process under essentially anyhdrous conditions. The product formed from superphosphoric acid and ammonia is granulated in a conventional drum type granulator along with other water soluble plant food ingredients as desired, and the product which is formed is substantially moisture free and, accordingly, resistant to caking. This freedom from caking permits the omission of coating or conditioning agents normally added as anticaking agents. This is highly advantageous inasmuch as such coating agents are water insoluble finely ground clays which contribute to the insoluble residue remaining when the product is dissolved in water.

More particularly, the present invention comprises the combination of superphosphoric acid containing at least 65% phosphorus pentoxide with free ammonia and water soluble ammonium salts or urea under conditions which ensure that not more than about 1% water based on total solids is present during the course of the reaction. Such a procedure ensures that a free flowing water soluble product will be produced with a minimum amount of granulation to obtain acceptable particle size. Because the superphosphoric acid may be very viscous (around 780 centipoises at 80° F. as compared to about 17 centipoises at 80° F. for ordinary phosphoric acid) or may in fact be solid at room temperature, it is desirable to reduce the viscosity thereof by heating. The heated superphosphoric acid is then combined with ammonia in the presence of ammonium nitrate or urea and water soluble phosphates or potassium salts. If the product is of a type not requiring potassium, this salt can be omitted.

APA is the term commonly used in the fertilizer industry to indicate the available phosphoric acid content of any one compound as phosphorus pentoxide ($P_2O_5$). As used herein, the designation APA has this art accepted significance. The superphosphoric acid utilized in producing the novel compositions of this invention must contain in excess of 65% APA and not more than 10% water. Superphosphoric acids containing about 70–80% phosphorus pentoxide can be employed advantageously in the process, although in the preferred form of the invention superphosphoric acid containing about 75–77% phosphorus pentoxide is employed. The commercially available superphosphoric acid most common in the plant food industry contains about 76% APA. Acid having 75% APA is equivalent to 103.5% orthophosphoric acid and acid having 76% APA is equivalent to 105% orthophosphoric acid. Recently 79% APA acid has become available and this acid is equivalent to 108% orthophosphoric acid. As noted previously, the superphosphoric acid is highly viscous and requires some heating to reduce the viscosity, but even when heated the acid is sirupy or tacky in nature. This quality of the acid is beneficial in granulation, since it permits limited agglomeration of the product. As the reaction proceeds, the sirupy or tacky nature of the acid promotes the concentration of fines and increases uniformity of particle size in the product.

Small amounts of water present adventitiously in any of the ingredients will be removed by the polyphosphoric acids present in the superphosphoric acid. These polyphosphoric acids react with water to form orthophosphoric acids, thus combining any free water present in the mixture to form the orthophosphoric acid. Superphosphoric acids of 70% APA and greater contain upwards of 3% polyphosphoric acids.

The nitrogen supplying ingredients supplementing the ammonium phosphate produced in situ in the process of the invention should be water soluble and can be selected from ammonia and ammonium salts which are free of water insoluble impurities. Anhydrous ammonia, ammonium nitrate, and mono- and diammonium phosphates can be used to supplement the nitrogen content of the granulated product and these materials can be employed individually or in combination with each other, or in combination with an organic nitrogen supplying material such as urea. The inorganic salts can be and preferably are in the crystalline or prilled form and the most uniform products result if urea or ammonium nitrate is in the prilled form. A particularly useful nitrogen supplement is a solution of ammonia and ammonium nitrate. Such a solution is prepared by oxidizing anhydrous ammonia to nitric acid, thereafter forming ammonium nitrate by neutralization of the nitric acid with ammonia, and finally adding excess ammonia so as to form a concentrated ammonia-ammonium nitrate water solution having no more than about 6% water. Such solutions are often preferred to ammonium sulfate or liquid anhydrous ammonia as an available nitrogen source, inasmuch as these solutions show no tendency to crystallize out and generally exhibit a high analysis. Potassium, where desired, is provided by water soluble potassium salts such as potassium sulfate, nitrate, potassium chloride, etc.

Manufacture of the dry granular water soluble product can be carried out in granulating equipment of the inclined drum type such as that illustrated in U.S. Patent No. 2,999,015 to E. N. Mortenson et al. Other granulating equipment of like design can also be employed. The superphosphoric acid is desirably heated to reduce the viscosity of the acid to a pourable consistency and the acid is then introduced into the reaction zone. The viscosity of the superphosphoric acid varies with the strength of the acid and with temperature, and as a result it is desirable to heat the acid to about 110–150° F. so as to facilitate introduction of the acid to the granulator and also to improve distribution of the acid during granulation. Approximately stoichiometric amounts of the acid are employed to react with anhydrous ammonia or other free ammonia sources. As these materials react, heat is evolved, increasing the temperature of the granulating mixture and the solubility of the nitrogen supplying reactant is increased. The liquid phase of the mixture increases and the product which is formed can be described as hard granular particles containing little detectable imbibed water. The liquid phase of the reaction mixture can best be described as a mixture of moisture free, molten fertilizer compounds.

The product, after reaction of the superphosphoric acid with the free ammonia, is passed out of the granulator where it is cooled and classified and that portion passing a No. 6 screen and being retained on a No. 20 screen is passed to storage. Finer particles are recycled through the granulator, providing agglomeration centers upon which the monoammonium phosphates and/or diammonium phosphate are deposited. The tacky or sirupy nature of the superphosphoric acid aids in granulating these fine particles, since the acid picks up the fines when they are recycled through the granulator.

The following examples illustrate specific embodiments of the invention. The examples are not to be considered limiting, however.

*Example I*

A mixture of 1,630 grams potassium chloride and 9,740 grams of prilled urea were placed in a test granulator. 1,305 grams of superphosphoric acid (75.5% APA) was heated to 150° F. and this heated mixture was placed in a batching tank. 374 grams of anhydrous ammonia was placed in another batching tank. The bed of solids was agitated to provide a rolling bed over which the superphosphoric acid was sprayed. Introduction of the superphosphoric acid to the granulator was started about 15 seconds before the anhydrous ammonia was injected under the rolling bed of solids. The total reaction time was about 3 minutes and introduction of superphosphoric acid was controlled so that this material was being sprayed into the granulator for about 15 seconds before all ammonia had been introduced. The product was almost perfectly granulated and on size. The particle size distribution was as follows:

| Screen size mesh: | Percent |
|---|---|
| +6 | 2.06 |
| −6 +8 | 18.88 |
| −8 +16 | 77.17 |
| −16 +20 | 1.17 |
| −20 +30 | 0.18 |
| −30 | — |

The product analyzed as follows:

| Element: | Percent |
|---|---|
| Total nitrogen | 35.20 |
| Ammonia nitrogen | 2.30 |
| Organic nitrogen (urea) | 32.90 |
| APA | 7.45 |
| Potassium oxide | 7.3 |
| Moisture | 1.02 |

*Example II*

A 22.35–10–15 grade was prepared by placing 2,500 grams of granular potassium chloride and 5,610 grams of uncoated ammonium nitrate prills in the granulator. The solids mixture was agitated to form a rolling bed and 1,325 grams of superphosphoric acid and 365 grams of anhydrous ammonia were introduced from batching tanks in the manner illustrated in Example I. The product, like that of Example I, granulated very efficiently and the particles size of the product was distributed as follows:

| Screen size mesh: | Percent |
|---|---|
| +6 | 0 |
| −6 +8 | 4.6 |
| −8 +10 | 35.5 |
| −10 +16 | 55.5 |
| −16 | 4.4 |

The analysis of the product is as follows:

| Element: | Percent |
|---|---|
| Total nitrogen | 20.20 |
| Ammonia nitrogen | 11.20 |
| Nitrate nitrogen | 9.00 |
| APA | 10.78 |
| Potassium oxide | 18.07 |
| Moisture (without drying) | 0.45 |

The product is 100% water soluble and resembles white prilled ammonium nitrate. Close inspection of the product reveals a coating of the neutralized superphosphoric acid on the surface of the potash crystals and ammonium nitrate prills.

*Example III*

This formula is distinguished from the formula of Examples I and II in that the dry water soluble solids employed in the mix are not all granular but the potassium sulfate and diammonium phosphate are crystalline while the muriate of potash and urea are granular. Accordingly, some new granules are formed, in addition to building up the granules already in the mix.

A mixture of 585 grams granular potassium chloride, 725 grams crystalline potassium sulfate, 755 grams crystalline diammonium phosphate, and 1,180 grams of uncoated urea prills is placed in the granulator and the mixture is agitated to form a rolling bed of solids. 1,330 grams of 76% APA superphosphoric acid is heated to a temperature of 150° F. to increase the fluidity of the acid and this acid is sprayed on the rolling bed of solids while 305 grams of anhydrous ammonia is introduced into the bed of solids. The product emanating from the granulator is recycled at a 1:1 ratio with the 5,000-gram batch in the granulator. The fines and some of the on-size materials are included in the recycle batch. The screen size of the product is as follows:

Screen size mesh: | Percent
--- | ---
+6 | 2.6
−6 +8 | 4.7
−8 +10 | 7.0
−10 +16 | 43.5
−16 +20 | 22.4
−20 | 18.8

The analysis of the product is as follows:

Element: | Percent
--- | ---
Total nitrogen | 20.20
Ammonia nitrogen | 10.30
Organic nitrogen (urea) | 9.90
APA | 28.05
Potassium oxide | 14.61
Moisture (without drying) | 0.60

*Example IV*

Because all of the solid raw materials in this example are crystalline, it is necessary in order to granulate effectively to maintain a high recycle ratio to build up particle size. The solids component which is placed in the granulator includes 2,230 grams of crystalline diammonium phosphate and 493 grams of crystalline potassium sulfate. This mixture is agitated to form a rolling bed and 1,750 grams of heated 76% APA superphosphoric acid is sprayed over the surface of the bed. 427 grams of anhydrous ammonia are introduced into the bed and granulation is carried out over a period of about 3 minutes. The product is recycled at a 1:1 ratio with the 5,000-gram batch to build up particle size. The product particle size distribution is as follows:

Screen size mesh: | Percent
--- | ---
+6 | 0.7
−6 +8 | 2.0
−8 +10 | 13.1
−10 +16 | 78.6
−16 +20 | 1.9
−20 | 3.7

The product analyzed as follows:

Element: | Percent
--- | ---
Total nitrogen | 15.80
APA | 52.50
Potassium oxide | 5.60
Moisture (without drying) | 0.45

The invention is particularly useful in the production of high-grade plant foods; that is, those containing a nitrogen source selected from the group consisting of urea and ammonium nitrate providing more than about 300 pounds of said urea or ammonium nitrate per ton of plant food coated with neutralized superphosphoric acid. In the past, it has been difficult to granulate and dry plant foods containing large amounts of urea and/or ammonium nitrate since these materials are very soluble in water and regular phosphoric acid which is conventionally employed contains around 20–25% water. Thus, in the production of high-grade materials utilizing regular phosphoric acid, the nitrogen-supplying material becomes dissolved in the mixture and the mixture assumes the consistency of a mud. To overcome the poor consistency of the product and facilitate handling of the product, the material must be recycled through the mixture several times to absorb the fluid and obtain the proper consistency for granulation.

Utilizing superphosphoric acid in the method disclosed herein, it is possible to produce an on-size product with substantially less recycling. Thus, the formation of the product in accordance with the invention involves forming a rolling bed of fertilizer solids flowing in a given direction through a drum and injecting the superphosphoric acid and free ammonia into the bed and continuously passing the product from the reaction zone while avoiding the formation of a heavy slurry or mud such as would result, if substantial amounts of water were present in the reaction zone.

In the preferred form of the invention, electric furnace superphosphoric acid is employed, although in some cases a noncaking plant food having highly desirable characteristics can be prepared using wet-process superphosphoric acid. Wet-process superphosphoric acid is manufactured by concentrating lower-grade phosphoric acid made from phosphate rock and sulfuric acid. Wet-process superphosphoric acid has a lower APA (68–72%) than electric furnace superphosphoric acid, which usually contains more than about 70% APA. In addition, wet-process superphosphoric acid contains minor amounts of dissolved metal phosphates and organic materials which are not substantially completely soluble in water. Finally, it is not as reactive as electric furnace superphosphoric acid and will not ammoniate as highly as the electric furnace type. Nevertheless, it is possible to produce a granulated, low-moisture plant food without drying the product and it is possible to produce farm grade plant foods using wet process superphosphoric acid. Moreover, although there are some water-insoluble materials present in the product, there does not appear to be sufficient residue of sufficient size to clog the spray nozzles in distribution equipment. Finally, even in those cases where the fertilizer contains an objectionable amount of water-insoluble salts, it is possible to add a small amount of electric furnace superphosphoric acid to the plant food to sequester metals. Electric furnace superphosphoric acid possesses the highly desirable quality of sequestering metals.

It is possible in accordance with the invention to manufacture high-analysis, solid fertilizers by the in situ formation of ammonium phosphate from superphosphoric acid and free ammonia in a form which contains less than about 0.5% water without drying of the product. The individual solids particles are coated with dry ammoniated superphosphoric acid and the particles show less tendency to cake. There is little or no nitrogen loss by virtue of nitrate decomposition as superphosphoric acid does not react with nitrates and any extraneous minerals present in the solids sequestered by superphosphoric acid.

Obviously, many modifications and variations of the invention as hereinbefore set forth may be made without departing from the spirit and scope thereof and, therefore, only those limitations should be imposed as are indicated in the appended claims.

I claim:

1. A substantially dry granular high-nitrogen plant food composition comprising: a nitrogen source selected from the group consisting of urea and ammonium nitrate providing more than about 300 pounds of said urea or ammonium nitrate per ton of plant food coated with neutralized superphosphoric acid, said plant food being in granular form and containing less than about 1% water and being substantially soluble in water.

2. A substantially dry, granular, high-nitrogen plant food composition comprising: a nitrogen source selected from the group consisting of urea and ammonium nitrate providing more than about 300 pounds of said urea or ammonium nitrate per ton of plant food coated with neutralized superphosphoric acid, said plant food being in granular form having a particle size so that at least 87% passes a No. 8 screen and no more than about 15% passes a No. 20 screen, said particles containing less than about 1% water and being substantially soluble in water.

References Cited by the Examiner
UNITED STATES PATENTS

| | | | |
|---|---|---|---|
| 2,522,500 | 9/1950 | Bridger | 71—41 |
| 2,999,015 | 9/1961 | Mortenson et al. | 71—64 |
| 3,005,696 | 10/1961 | Hignett et al. | 71—64 |
| 3,015,552 | 1/1962 | Striplin et al. | 71—41 |
| 3,022,154 | 2/1962 | Potts et al. | 23—107 |
| 3,117,857 | 1/1964 | Goodale et al. | 71—64 |
| 3,153,574 | 10/1964 | Achorn et al. | 71—43 |
| 3,171,733 | 3/1965 | Hignett et al. | 71—43 |

OTHER REFERENCES

Agricultural and Food Chemistry—"High-Analysis Liquid Fertilizer from Super-Phosphoric Acid," Striplin et al., vol. 7, No. 9, September 1959, pp. 623–628.

S. LEON BASHORE, *Acting Primary Examiner.*

ANTHONY SCIAMANNA, *Examiner.*

T. D. KILEY, *Assistant Examiner.*